(12) United States Patent
Haustein et al.

(10) Patent No.: US 11,080,147 B2
(45) Date of Patent: Aug. 3, 2021

(54) ADJUSTING BACKUP DATA IN RESPONSE TO AN ABNORMALITY DETECTION

(71) Applicant: International Business Machines Corporation, Armonk, NY (US)

(72) Inventors: Nils Haustein, Soergenloch (DE); Dominic Mueller-Wicke, Weilburg (DE)

(73) Assignee: International Business Machines Corporation, Armonk, NY (US)

(*) Notice: Subject to any disclaimer, the term of this patent is extended or adjusted under 35 U.S.C. 154(b) by 260 days.

(21) Appl. No.: 15/981,758

(22) Filed: May 16, 2018

(65) Prior Publication Data
US 2019/0354443 A1    Nov. 21, 2019

(51) Int. Cl.
*G06F 11/14* (2006.01)
*G06F 21/56* (2013.01)
*G06F 16/17* (2019.01)

(52) U.S. Cl.
CPC ...... *G06F 11/1464* (2013.01); *G06F 11/1451* (2013.01); *G06F 16/1734* (2019.01); *G06F 21/566* (2013.01); *G06F 2201/84* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 5,943,688 A * | 8/1999 | Fisher | .................. | G06F 11/1458 711/162 |
| 7,827,447 B2 * | 11/2010 | Eberbach | .............. | G06F 11/004 714/45 |
| 8,260,750 B1 * | 9/2012 | Gugick | ............... | G06F 11/1461 707/645 |
| 8,335,768 B1 * | 12/2012 | Desai | .................. | G06F 11/1448 707/674 |
| 8,484,737 B1 * | 7/2013 | Swift | .................. | H04L 63/1441 709/224 |
| 9,317,686 B1 | 4/2016 | Ye et al. | | |
| 9,477,693 B1 * | 10/2016 | Bachu | ................. | G06F 11/1438 |
| 2009/0125577 A1 * | 5/2009 | Kodama | ............. | G06F 11/1458 709/201 |
| 2013/0191347 A1 * | 7/2013 | Bensinger | ........... | G06F 11/1469 707/649 |
| 2017/0177867 A1 | 6/2017 | Crofton et al. | | |
| 2017/0223031 A1 | 8/2017 | Gu et al. | | |
| 2019/0236274 A1 * | 8/2019 | Brenner | ............. | G06F 11/1451 |

\* cited by examiner

*Primary Examiner* — Robert W Beausoliel, Jr.
*Assistant Examiner* — Cheryl M Shechtman
(74) *Attorney, Agent, or Firm* — Zilka-Kotab, P.C.

(57) ABSTRACT

A computer-implemented method according to one embodiment includes identifying abnormal data modification characteristics at a first system, determining time data associated with the abnormal data modification characteristics, and adjusting an instance of backup log data stored at a second system, utilizing an identification of the abnormal data modification characteristics and the time data associated with the abnormal data modification characteristics.

20 Claims, 8 Drawing Sheets

ADJUSTING BACKUP DATA IN RESPONSE TO AN ABNORMALITY DETECTION

BACKGROUND

The present invention relates to data storage and recovery, and more specifically, this invention relates to automatically detecting abnormal data modification characteristics and freezing associated backup data in response to the detection.

Backup data storage is often used to maintain the integrity of stored data. For example, data stored at a first system may be backed up at a second system. However, when data stored at the first system is corrupted (e.g., via malware or other means, etc.), it may be inadvertently backed up to the second system, and may overwrite or push out clean backup data stored at the second system.

SUMMARY

A computer-implemented method according to one embodiment includes identifying abnormal data modification characteristics at a first system, determining time data associated with the abnormal data modification characteristics, and adjusting an instance of backup log data stored at a second system, utilizing an identification of the abnormal data modification characteristics and the time data associated with the abnormal data modification characteristics.

According to another embodiment, a computer program product for adjusting backup data in response to an abnormality detection comprises a computer readable storage medium having program instructions embodied therewith, where the computer readable storage medium is not a transitory signal per se, and where the program instructions are executable by a processor to cause the processor to perform a method comprising identifying abnormal data modification characteristics stored at a first system, utilizing the processor, determining time data associated with the abnormal data modification characteristics, utilizing the processor, and adjusting, utilizing the processor, an instance of backup log data stored at a second system, utilizing an identification of the abnormal data modification characteristics and the time data associated with the abnormal data modification characteristics.

A system according to another embodiment includes a processor, and logic integrated with the processor, executable by the processor, or integrated with and executable by the processor, where the logic is configured to identify abnormal data modification characteristics stored at a first system, determine time data associated with the abnormal data modification characteristics, and adjust an instance of backup log data stored at a second system, utilizing an identification of the abnormal data modification characteristics and the time data associated with the abnormal data modification characteristics.

Other aspects and embodiments of the present invention will become apparent from the following detailed description, which, when taken in conjunction with the drawings, illustrate by way of example the principles of the invention.

DETAILED DESCRIPTION

Figure 1:
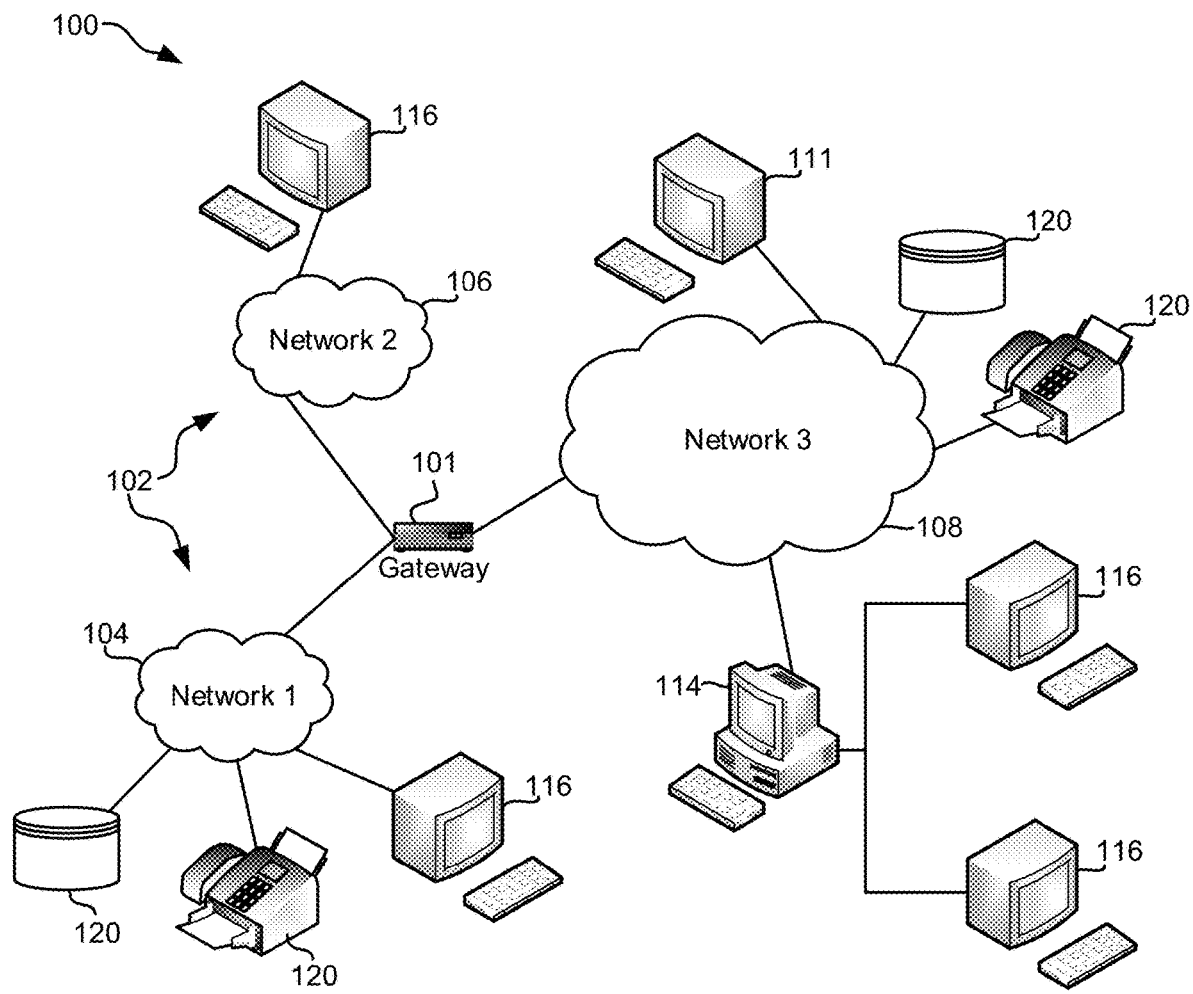
FIG. 1 illustrates a network architecture, in accordance with one embodiment.

The following description discloses several preferred embodiments of systems, methods and computer program products for adjusting backup data in response to an abnormality detection. Various embodiments provide a method to detect abnormalities in data modification characteristics stored at a first system, and freeze associated backup data stored at a second system, in response to the detection.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting backup data in response to an abnormality detection.

In one general embodiment, a computer-implemented method includes identifying abnormal data modification characteristics at a first system, determining time data associated with the abnormal data modification characteristics, and adjusting an instance of backup log data stored at a second system, utilizing an identification of the abnormal data modification characteristics and the time data associated with the abnormal data modification characteristics.

In another general embodiment, a computer program product for adjusting backup data in response to an abnormality detection comprises a computer readable storage medium having program instructions embodied therewith, where the computer readable storage medium is not a transitory signal per se, and where the program instructions are executable by a processor to cause the processor to perform a method comprising identifying abnormal data modification characteristics stored at a first system, utilizing the processor, determining time data associated with the abnormal data modification characteristics, utilizing the processor, and adjusting, utilizing the processor, an instance of backup log data stored at a second system, utilizing an identification of the abnormal data modification characteristics and the time data associated with the abnormal data modification characteristics.

In another general embodiment, a system includes a processor, and logic integrated with the processor, executable by the processor, or integrated with and executable by the processor, where the logic is configured to identify abnormal data modification characteristics stored at a first system, determine time data associated with the abnormal data modification characteristics, and adjust an instance of backup log data stored at a second system, utilizing an identification of the abnormal data modification characteristics and the time data associated with the abnormal data modification characteristics.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
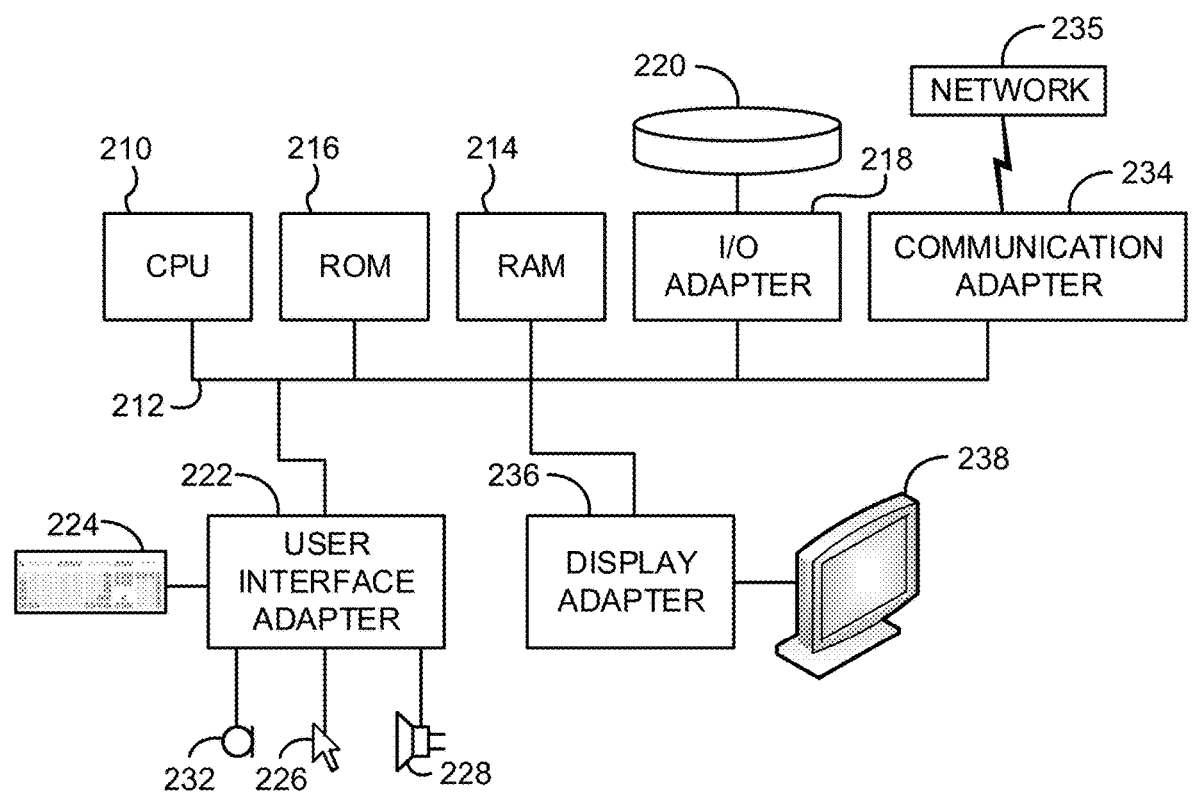
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
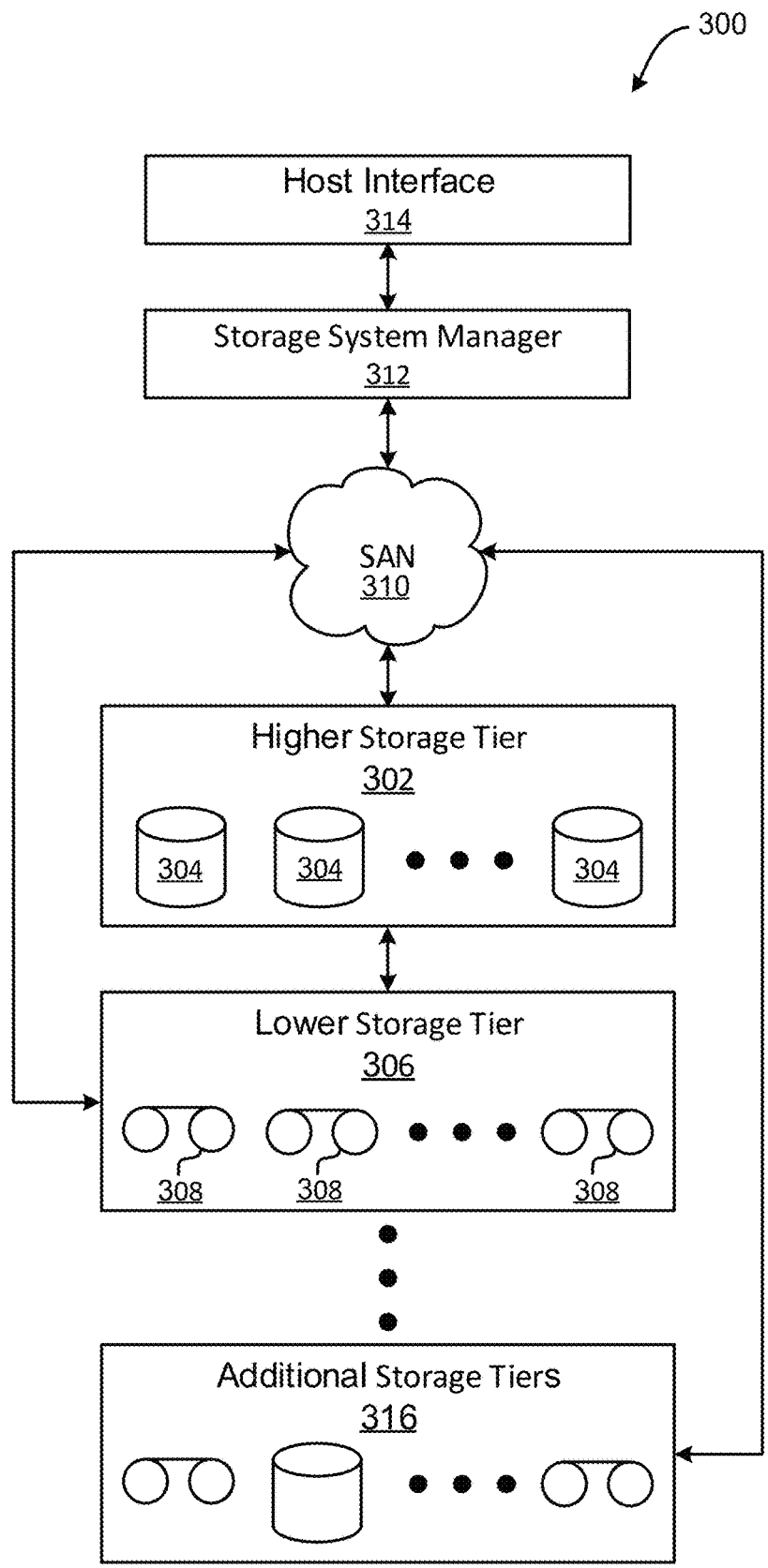
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
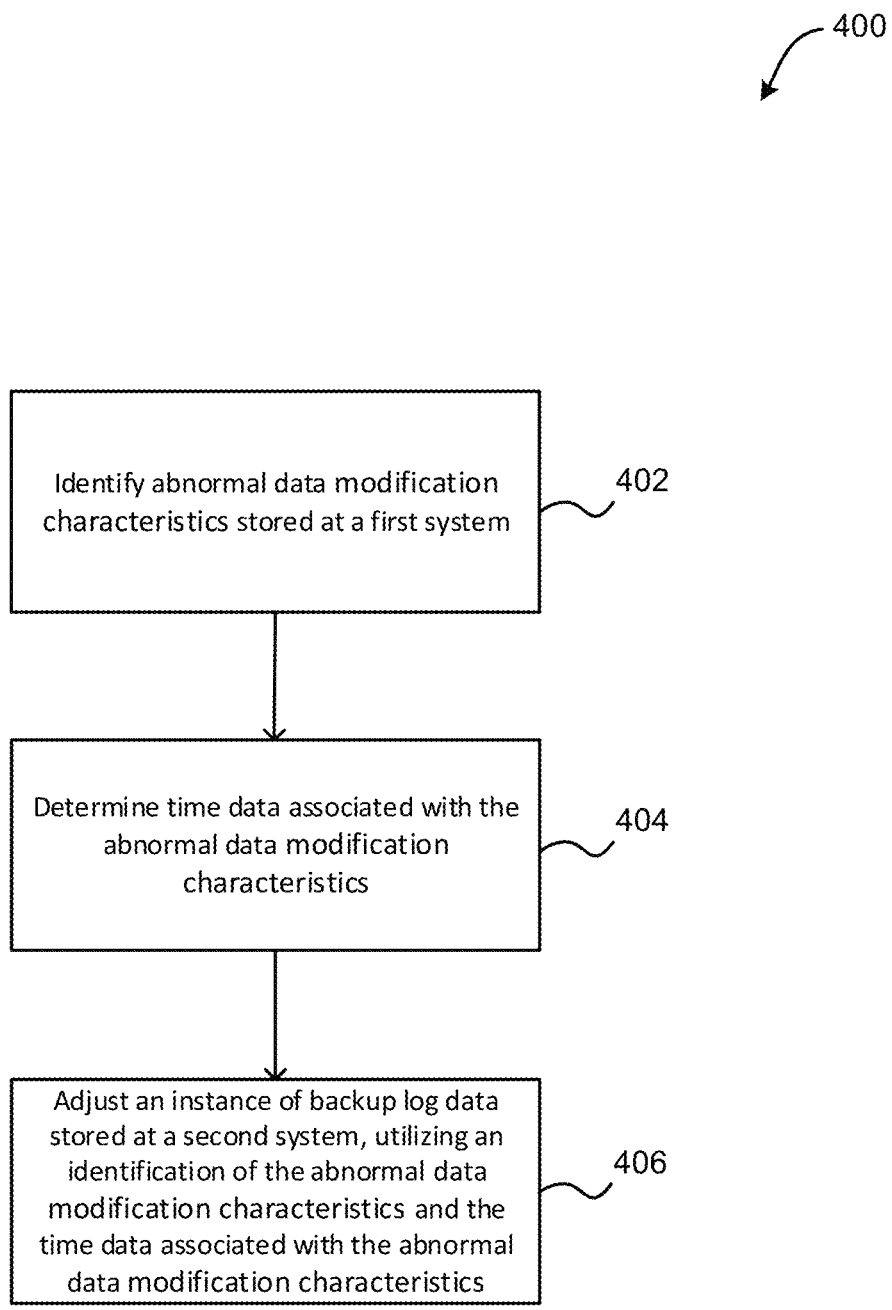
FIG. 4 illustrates a method for adjusting backup data in response to an abnormality detection, in accordance with one embodiment.

Now referring to FIG. 4, a flowchart of a method 400 is shown according to one embodiment. The method 400 may be performed in accordance with the present invention in any of the environments depicted in FIGS. 1-3 and 5-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where abnormal data modification characteristics stored at a first system are identified. In one embodiment, the first system may include a first server that includes a first storage that stores data. In another embodiment, the first system may include a backup client application. For example, the backup client application may periodically send a copy of the data from the first storage of the first system to a second system as part of a data backup (e.g., to be stored at a second storage of the second system, etc.). In yet another embodiment, the second system may include a second server with a backup server application. In still another embodiment, the first system and the second system may both be located on a single server. In yet another embodiment, the second system may extract information (e.g., details of the copy of the data, etc.) from the copy of the data, and may store the information in a backup index of the second system.

Additionally, in one embodiment, the abnormal data modification characteristics may include an indication of data changed within the first system by malware present within the first system, by one or more system faults, etc. For example, the abnormal data modification characteristics may include infected data, encrypted data (e.g., data encrypted by malware, etc.). In another embodiment, the abnormal data modification characteristics may include one or more objects.

Further, in one embodiment, the abnormal data modification characteristics may be identified at the second system. For example, details of a current data backup process (e.g., a duration of the current data backup process, a volume of the current data backup, etc.) may be identified at the second system, where the current data backup process includes the backup of data stored at the first system. For instance, a data backup process may include a process where data is sent by the backup client of the first system to the backup server of the second system. In another example, the details of the current data backup process may be compared at the second system to details of historical data backup processes (e.g., a duration of the historical data backup processes, a volume of the historical data backups, etc.). For instance, the details of the historical data backup processes may be stored in a table at the second system. In yet another example, differences between the details of the current data backup process and the details of historical data backup processes may be determined at the second system. In still another example, differences that exceed a threshold may result in an identification at the second system of abnormal data modification characteristics within the current data backup process.

Further still, in one embodiment, the abnormal data modification characteristics may be identified at the first system. In one embodiment, details of the abnormal data modification characteristics may be identified at the first system. For example, the details of data that has changed within the first system since a last data backup process may be compared at the first system to details of historical data backup processes. For instance, the details of the historical data backup processes may be retrieved by the first system from the second system. In another example, differences between the details of the data that has changed since the last backup and the details of historical data backup processes may be determined at the first system. In yet another example, differences that exceed a threshold may result in an identification at the first system of abnormal data modification characteristics within the data that has changed within the first system since the last data backup process.

Also, in one embodiment, the abnormal data modification characteristics may be identified, utilizing an antivirus infection report. For example, an infection report may be accessed at the first system. In another example, the infection report may label data within the first system as infected. In another example, a virus scanner may run on the first system and may determine that data is infected and may identify the data within the infection report as a result of one or more virus scanning activities. The data labeled as infected within the infection report may then be identified as abnormal data.

In addition, method 400 may proceed with operation 404, where time data associated with the abnormal data modification characteristics are determined. In one embodiment, the time data may include a date and time of a most recent data backup that was performed before a first occurrence of the abnormal data modification characteristics. For example, the second system may determine a date and time of a most recent backup that does not include the abnormal data modification characteristics. In another example, the first system may determine a date and time of a most recent backup performed before the abnormal data modification characteristics was identified.

Furthermore, in one embodiment, the time data may include a time that the abnormal data modification characteristics was identified. For example, the first system may determine a date and time that the data was labeled as infected by a virus scanner.

Further still, method 400 may proceed with operation 406, where an instance of backup log data stored at a second system is adjusted, utilizing an identification of the abnormal data modification characteristics and the time data associated with the abnormal data modification characteristics. In one embodiment, the second system may include a server running a backup server application. In another embodiment, the second system may perform one or more backups of data stored at the first system. For example, the second system may periodically perform one or more backups of data stored at the first system.

Also, in one embodiment, the backup log data may include a record describing a copy of data that is retrieved from a first storage of the first system and stored at a second storage of the second system. For example, the second system may perform the backup by retrieving data from the first storage of the first system and storing the retrieved data at the second storage of the second system. In another embodiment, the second system may utilize a backup index at the second system that is separate from the second storage of the second system to store the backup log data. For example, the backup log data may include an indication of data (e.g., data that was retrieved from the first system and stored at the second system, etc.). In another example, the backup log data may include a time and date that the data was backed up (e.g., a time and date that the data was retrieved from the first system and stored at the second system, etc.). In yet another example, the backup log data may include an indication of a location of the data at the second storage of the second system (e.g., a pointer to the data that was retrieved from the first system and stored at the second system, etc.).

Additionally, in one embodiment, the instance of backup log data may include a version of the backup log data. For example, the second system may implement versioning within the backup index. In another example, multiple instances (e.g., versions, etc.) of backup log data may be associated with a single instance of data (e.g., a single object) from the first system for which a backup is performed. In yet another example, multiple backups may be performed for the single instance of data that is modified by a user or application over time, and each backup may be associated with unique backup log data indicating a unique time and date that the backup of the data was performed.

Further, in one embodiment, adjusting the instance of backup log data may include identifying an instance of backup log data within the backup index that has an associated time and date that precedes the time data associated with the abnormal data modification characteristics. For example, the youngest (e.g., most recent, etc.) backup log data that has an associated time and date that precedes the time data associated with the abnormal data modification characteristics may be selected.

Further still, in one embodiment, adjusting the instance of backup log data may include adding a freeze retention time to the identified instance of backup log data within the backup index. For example, the backup index may include an additional field that indicates a freeze retention time associated with each instance of backup log data. In another example, only a subset of instances of backup log data within the backup index may have a freeze retention time in the associated field.

In yet another example, the freeze retention time for an instance of backup log data may indicate a time period during which the instance of backup log data is to be kept within the backup index, and backup data associated with the instance of backup log data is to be maintained within a second storage of the second system. For instance, new instances of backup log data may be periodically received for an object (e.g., as backup operations are periodically performed between the first system and the second system, etc.). Additionally, old instances of backup log data may be removed from the backup index as the new instances are received (e.g., utilizing a first in, first out (FIFO) removal scheme, etc.). Further, an instance of backup log data having an associated freeze retention time may be maintained (e.g., may not be removed, etc.) from the backup index, and backup data associated with the instance of backup log data may be maintained within a second storage of the second system, during the time period indicated by the freeze retention time (e.g., even if removal of the backup log data is appropriate under the FIFO removal scheme).

In this way, instances of backup log data associated with clean data may be retained at the second system and not overwritten by later instances of backup log data associated with abnormal data modification characteristics during subsequent backup operations between the first system and the second system.

Additionally, in one embodiment, backup data (e.g., data copied and sent from the first system to the second system, etc.) maintained within the second storage of the second system may be restored to the first storage of the first system, utilizing the backup log data stored in the backup index at the second system. For example, the backup log data may be used to locate the backup data within the second storage, and the backup data may be retrieved and returned to the first storage of the first system (e.g., in response to a loss of the original data at the first system, etc.).

In another example, a request to restore data including a date and time to be restored may be received. Additionally, the instance of backup log data may be selected within the backup index at the second system, in response to the request to restore data. For instance, the request to restore may be triggered by a loss, by an observation that the original data has been infected, etc. The request to restore data may also include the object name and the point in time for the restore. The instance of backup log data may be selected in response to determining that an associated time and date of the instance of backup log data precedes the received date and time to be restored.

In one embodiment, the instance of backup log data may be selected in response to determining that an associated time and date of the instance of backup log data is a most recent instance of backup log data at the second system that precedes the received date and time to be restored. Additionally, the instance of backup log data may include a freeze retention time, and the instance of backup log data may be selected in response to determining that the freeze retention time has not expired. In another embodiment, the instance of backup log data may be restored to a first storage of the first system.

In another embodiment, a retention time of backup data maintained within the second storage of the second system may be managed, utilizing the backup log data stored in the backup index at the second system. For example, backup data may be conditionally deleted from the second storage based on an analysis of the backup log data.

Performing data backup may include creating one or more copies of data that is stored in a primary storage location. The one or more copies may be stored in a backup storage location. If the backup storage location is placed at a different physical location from the primary storage location, then this backup may implement "air gap" data protection.

One requirement for data backup may include restoring data at the primary storage location in case the data stored in the primary storage location gets lost, corrupted or otherwise damaged. In one embodiment, during the restore, the data may be copied from the backup storage location to the primary storage location.

Initial Backup Architecture

Figure 5:
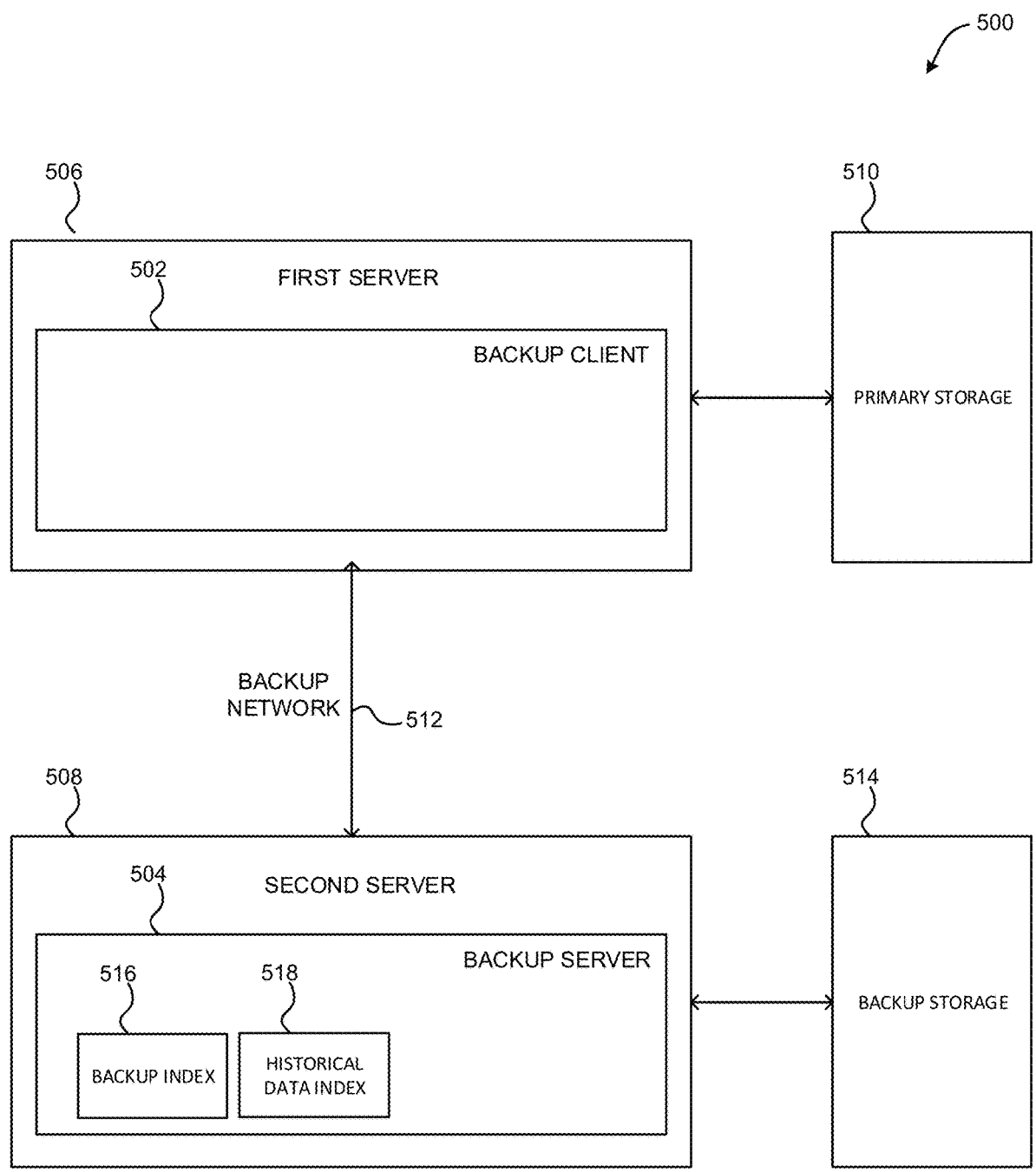
FIG. 5 illustrates an exemplary backup system, in accordance with one embodiment.

FIG. 5 illustrates an exemplary backup system 500, according to one embodiment. As shown, the backup system 500 includes a backup client 502 running on a first server 506 and a backup server 504 running on a second server 508. In one embodiment, the backup client 502 may include software that runs on the first server 506. In another embodiment, the primary data may be stored in primary storage 510 attached to the first server 506.

Additionally, in one embodiment, the backup client 502 may periodically back up data stored in primary storage 510 to the backup server 504 over a backup network 512. The backup server 504 may include software that runs on the second server 508, and may receive the backup data and store it in backup storage 514. In addition, the backup server 504 may extract metadata from the backup data and may store the metadata in a backup index 516. The backup server 504 may also retain historical data 518 about all backup processes. This historical data 518 may include the sets of data that were backed up, the amounts of data being backed up during a backup process, the number of backup objects being backed up, transfer rates between client and server during the backup process, failure statistics, etc. This historical data may be kept in a table within the historical data 518.

Further, in one embodiment, the primary storage 510 may be storage included in the first server 506 or it may be storage connected over a network to the first server 506. It may be based on any storage technology (e.g., flash, SSD, disk, tape, optical, etc.) or a combination of storage technologies. Data stored in the primary storage 510 may include one or more of files, object, blocks, full disk images, etc. The content protected may be any kind of data (e.g., application written files, database containers, virtual machine disks, etc.).

Further still, in one embodiment, the backup process may occur periodically (e.g. once a day, etc.) or may be event-driven, (e.g., based on a maximum number of changed blocks in terms of change block tracking, etc.). In another embodiment, a file may become a candidate for backup if content of the file changes, which may affect a timestamp of the file. For example, a changed timestamp associated with a file may be an indication that is used by a backup program to identify the file as a backup candidate.

Also, in one embodiment, the backup network 512 may include a network connection such as an ethernet network connection, an infiniband network connection, a fiber channel network connection, etc. A communication protocol used over the backup network 512 may allow the backup client 502 to query for backup data, send backup data, and restore backup data.

In addition, in one embodiment, the backup storage 514 may include storage located within the second server 508 or it can include storage connected over a network to the second server 508. In another embodiment, the backup storage 514 may be based on any storage technology such as one or more of flash, SSD, disk, tape, optical, etc. Because the backup client 502 and the backup server 504 may not be located in the same location (e.g., rack, room, datacenter, etc.), this kind of backup solution may also be an airgap solution. The term may airgap mean that there is a distance between primary data and backup data.

Furthermore, in one embodiment, a plurality of backup clients may be running concurrently to back up data to a single backup server. In another embodiment, the backup server may keep metadata about the data being backed in the extended backup index 516.

Table 1 illustrates exemplary components of a backup index 516, in accordance with one embodiment. Of course, it should be noted that the exemplary backup index 516 shown in Table 1 is set forth for illustrative purposes only, and thus should not be construed as limiting in any manner.

TABLE 1

| Backup object name | Backup data | Storage location |
|---|---|---|
| /dir1/file1 | 08-17-2017 20:02:03 | Pointer1 |

Each row in Table 1 contains metadata for one backup object. The first column of Table 1 contains the backup object name. This can may include a file name, object name, block address, etc. In one embodiment, the backup object name may correspond to the name of the data in the primary storage. The second column of Table 1 contains the backup date. The backup date may include the date and time when the object has been backed up. The backup date may also include the change time of the object, indicating when this object has been changed on primary storage 510. The third column contains the storage location of the backup object in the backup storage 514. The storage location may depend on the implementation—for example, it may include one or more of a file name, a volume name with storage addresses, etc. According to Table 1, the backup object "/dir1/file1" has been backed up on 08-17-2017 at 20:02:03 and resides in the backup storage location referenced by Pointer1.

The extended backup index 516 shown in Table 1 may be used for restoring data. For example, when the backup client 502 requests a restore from the backup server 504, it may first query the backup server 504 for a certain backup object name and/or timestamp. If the query contains a backup object name, this may be matched against the first column of Table 1. If the query contains a time stamp, this may be matched against the second column of Table 1. With this matching, the backup server 504 may determine the storage location of the backup object and may restore it to the backup client 502 in response to a restore request issued by the backup client 502.

Versioning

In one embodiment, the backup server 504 may manage multiple versions for one backup object in the backup storage 514. Versioning may be useful if a most recent instance of a backup object gets corrupted or damaged. In this case the backup client 502 may instruct the backup server 504 to restore an older, uncorrupted version of the backup object. To manage multiple versions of an object, the extended backup index 516 may be used.

Table 2 illustrates exemplary components of a backup index 516 that supports versioning for a single object, in accordance with one embodiment. Of course, it should be noted that the exemplary backup index 516 shown in Table 2 is set forth for illustrative purposes only, and thus should not be construed as limiting in any manner.

TABLE 2

| Backup object name | Backup data | Storage location |
|---|---|---|
| /dir1/file1 | 08-17-2017 20:02:03 | Pointer1 |
| /dir1/file1 | 08-15-2017 20:01:43 | Pointer3 |
| /dir1/file1 | 08-14-2017 20:00:59 | Pointer4 |

As shown in Table 2, three versions of the backup object "/dir1/file1" (column 1) are stored, where each version is characterized by different backup data (column 2) and storage location (column 3). A new version may be created every time the object is backed up. An object may be backed up when its data content has changed on primary storage 510. The backup process may run periodically (e.g. once a day, once a week, etc.). The most recently stored version may include an "active" backup version. Old versions may be described as "inactive" backup versions. The most recently stored version is referenced in row 2 of Table 2 and the oldest version is referenced in row 4 of Table 2. If, for example, the most recent version has been infected by a virus, then the backup client 502 may query the backup server 504 for older versions of the backup object, and the backup server 504 may identify the backup data of older versions.

In one embodiment, the number of versions stored within the extended backup index 516 may be limited due to limited storage resources in the backup storage 514. For example, a finite number (e.g., 2-5, etc.) of versions of each backup object may be kept. If a total number of stored versions reaches the storage limit, the oldest instance of the backup object may be deleted. For the example, in Table 2, if the limit on the number of versions is three (3) and a new version of the file/dir1/file1 is backed up on 08-18-2017 20:02:32, then the oldest version (row 4 in Table 2) may be deleted in the extended backup index 516 while the new version will be added on top, resulting in a backup index 516 shown in Table 3. Of course, it should be noted that the exemplary backup index 516 shown in Table 3 is set forth for illustrative purposes only, and thus should not be construed as limiting in any manner.

TABLE 3

| Backup object name | Backup data | Storage location |
|---|---|---|
| /dir1/file1 | 08-18-2017 20:02:32 | Pointer5 |
| /dir1/file1 | 08-17-2017 20:02:03 | Pointer1 |
| /dir1/file1 | 08-15-2017 20:01:43 | Pointer3 |

In one embodiment, the backup versioning may act like a first in, first out (FIFO) pipeline, with a depth equal to the version number. For example, the first version that has been backed up may be removed from the pipeline once the number of versions is exceeded. In another embodiment, the most recently added version nay be the active version, and all others may be considered inactive.

Additionally, in one embodiment, inactive versions of a backup object may have an associated retention time. For example, inactive versions of a backup object may be deleted after the retention time has been expired. In another embodiment, excessive retention times for inactive versions may consume increased storage capacity. Therefore, indefinite retention times may not be used for inactive versions.

Further, in one embodiment, a period of the backup process and a number of versions may determine a minimum lifetime of a given backup object instance. For example, if the backup process period is daily and a number of versions is three, then the minimum lifetime of a backup object instance is 3 days (which is the number of versions multiplied by the backup period).

In another embodiment, the extended backup index 516 may include this metadata for many backup objects and versions. Based on the table structure, it may be possible to sort this information by backup object name and backup date in order to obtain a sorted list of backup objects and version.

Virus Scanner and Malware Detection Tools

In one embodiment, a virus scanner may run on the first server 506 and may scan data stored on the primary storage 510 for malware and infections. Different scan techniques may be utilized by the virus scanner, such as a bulk scan (which may periodically scan all or a subset of data on the primary storage 510). The virus scanner may also implement on-demand scans, where data is scanned after it has been written and/or before it is being read. When the virus scanner finds infected data or malware it may quarantine that data and may keep an infection record containing the name of the infected file and the date and time when the infection was identified.

Table 4 illustrates an exemplary infection record, in accordance with one embodiment. Of course, it should be noted that the exemplary infection record shown in Table 4 is set forth for illustrative purposes only, and thus should not be construed as limiting in any manner.

TABLE 4

| Object name | Infection identified data |
|---|---|
| /dir1/fileX | 09-01-2017 00:03:03 |
| /dir1/fileY | 09-01-2017 01:03:03 |
| /dir1/fileZ | 09-01-2017 00:10:00 |

Column 1 of Table 4 shows a full qualified file name of the infected files, and Column 2 of Table 4 shows the timestamp when the infection was detected.

Backup Malware Threat

New threats to company data can cause primary data stored in primary storage 510 and backup data stored in backup storage 514 to become corrupted and unusable. For example, malware running on the first server 506 may change primary data stored in primary storage 510. The malware alteration may change the file data and may result in changed time stamps for the file. The changed time stamps may make the file a candidate for backup. The subsequent backup process may back up the infected files. If the backup process runs once a day and the malware encrypts the object every day then all backup versions of this backup object may be encrypted. For example, if the number of backup versions is three, the backup period is daily, and the malware infects an object every day, then all backup versions and the primary version will be infected after 3 days.

As a result, the "air gap" between primary data and backup data may not be effective, since the malware may harm the primary copy of data as well as all backup copies. In addition, even if a virus scanner has identified an infected file, it might still be backed up causing the backup copies to also be infected.

Overcoming this Malware Threat

The malware threat identified above may be overcome by implementing a method in the backup server 504 or in the backup client 502 to detect abnormal changes to data stored in primary storage 510, and responsive to this, freeze a certain version of backup data. In another embodiment, the infection record of a virus scanner may be used to freeze certain versions of backup data. The frozen version may be denoted by the backup date which is a point in time right before the infection was detected. This frozen version of a backup object may be different from a normal backup version in terms of three factors: a) it is taken out of the versioning and b) has a different retention time (e.g., freeze retention time, etc.) and c) during the freeze retention time, a backup object may not be deleted or modified by any means (e.g., versioning, administrative commands, delete requests, etc.).

One advantage of this solution is that no extra backup process may be required. Instead, the extended backup index 516 may be expanded to reflect the frozen version. If a malware infection is detected, the backup server 504 may update the extended backup index 516 to mark a certain version of backup data to be frozen. A frozen version of a backup object may not be deleted or expired during the freeze retention time. The frozen version of a backup object may correspond to a point in time before the malware infection had started.

Updated Backup Architecture

Figure 6:
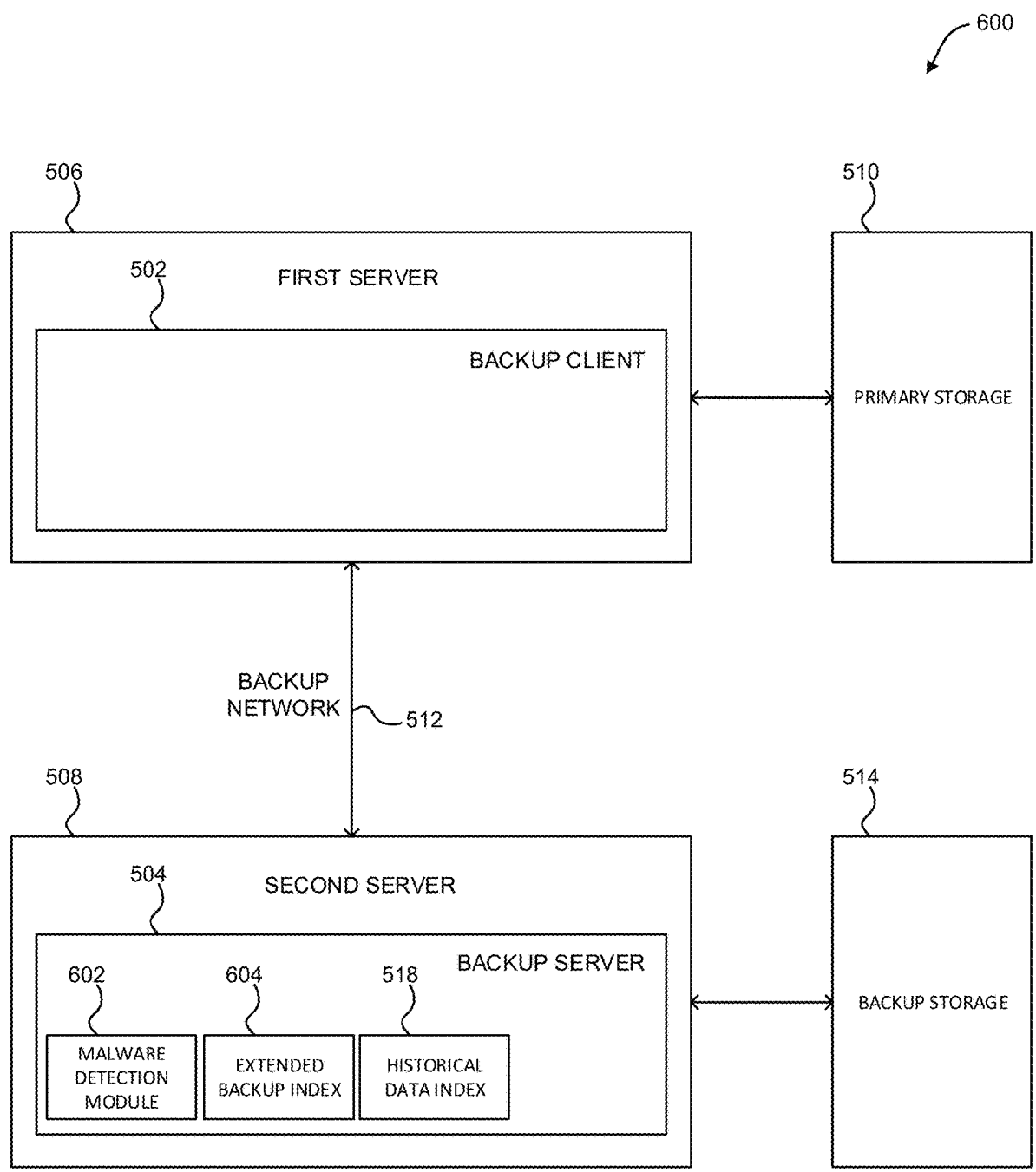
FIG. 6 illustrates a backup system for identifying and reacting to abnormal data, in accordance with one embodiment.

FIG. 6 illustrates a backup system 600 for identifying and reacting to abnormal data, according to one exemplary embodiment. In one embodiment, the backup system 600 may be an expansion of the exemplary backup system 500 shown in FIG. 5.

As shown, the backup server 504 includes a malware detection module (MDM) 602 and an extended backup index 604 that extends the extended backup index 516 as explained below. The MDM 602 may detect abnormal backup volumes for sets of data by matching data volumes of a current backup process with prior backup processes, leveraging historical data 518.

Table 5 illustrates exemplary historical backup volume data included within historical data 518, in accordance with one embodiment. Of course, it should be noted that the exemplary historical backup volume data shown in Table 5 is set forth for illustrative purposes only, and thus should not be construed as limiting in any manner.

TABLE 5

| Backup start date | Backup end date | Backup volume | Abnormal |
|---|---|---|---|
| 08-18-2017 18:00:00 | 08-19-2017 05:03:33 | 234 TB | X |
| 08-17-2017 18:00:00 | 08-17-2017 21:30:02 | 2.9 TB | |
| 08-15-2017 18:00:00 | 08-15-2017 22:00:34 | 3.5 TB | |
| 08-15-2017 18:00:00 | 08-15-2017 21:13:11 | 3.0 TB | |

Table 5 contains a start date of a backup (column 1) and an end date of the backup (column 2). This information can be used to calculate the backup duration. In column 3, the overall backup volume is counted. This information may be used to identify whether the current backup volume is abnormal compared to historical data from the MDM 602. In one embodiment, the backup volume may also include the number of objects backed up. After a backup instance is identified as infected, the MDM 602 may mark the backup run as infected in column 4. This may ensure that for future comparison of historical data, rows marked as abnormal won't be used.

In one embodiment, the detection of abnormal backup volumes may be based on a threshold. For example, if the backup volume of the current backup exceeds a predetermined percentage (e.g., 120%, etc.) of the average data volume of previous backup processes, the backup may be considered abnormal. In another embodiment, an abnormal backup duration, which may be identified by the time difference between a backup start time (e.g., column 1 in Table 5, etc.) and a backup end time (e.g., column 2 in Table 5, etc.) may be used as an indication for an abnormal backup. In yet another embodiment, one or more mathematical correlation techniques may be used to further define an abnormal backup.

Additionally, in one embodiment, the extended backup index 604 may include an additional field for each backup object version that denotes the freeze retention time. This field may also mark a certain version of the backup object as frozen.

Table 6 illustrates the exemplary backup index in Table 3 that is enhanced with a freeze retention time (see column 4), in accordance with one embodiment. Of course, it should be noted that the exemplary backup index shown in Table 6 is set forth for illustrative purposes only, and thus should not be construed as limiting in any manner.

TABLE 6

| Backup object name | Backup date | Storage location | Freeze Retention time |
|---|---|---|---|
| /dir1/file1 | 08-18-2017 20:02:32 | Pointer5 | |
| /dir1/file1 | 08-17-2017 20:02:03 | Pointer1 | |
| /dir1/file1 | 08-15-2017 20:01:43 | Pointer3 | 09-15-2017 20:01:43 |

As shown in Table 6, the third version of the backup object "/dir1/file1" has a freeze retention time that lasts until 08-17-2017 20:02:03 (row 4, column 4). This means the particular backup version may be frozen for this time denoted by the freeze retention time and may not be deleted by any means.

Additionally, the backup date (column 2 in Table 6) may include the date and time when the object has been backed up. However, in one embodiment, it may also include the change time of the object indicating when this object has been changed on primary storage 510. In another embodiment, it may also include the modification time of the object indicating when the data of the object has been modified. The term "backup date" allows for different interpretations and usage of the timestamp indicating when this version of an object has been backed up.

In one example, assume that the version limit for the object is 3 and a new copy of the backup object "/dir1/file1" is backed up from the backup client 502 to the backup server 504 on 08-19-2017 at 20:02:32. The backup server 504 may update the extended backup index 604 by keeping the version(s) with the freeze retention time, with results as shown in Table 7. Of course, it should be noted that the exemplary backup index shown in Table 7 is set forth for illustrative purposes only, and thus should not be construed as limiting in any manner.

TABLE 7

| Backup object name | Backup date | Storage location | Freeze Retention time |
|---|---|---|---|
| /dir1/file1 | 08-19-2017 20:02:32 | Pointer6 | |
| /dir1/file1 | 08-18-2017 20:02:32 | Pointer5 | |
| /dir1/file1 | 08-15-2017 20:01:43 | Pointer3 | 09-15-2017 20:01:43 |

As shown in Table 7, row 2 indicates that the new backup version is added to the backup index but the oldest backup version with no freeze retention times is deleted (row 3 in Table 7). This means the backup version with retention (row 4 in Table 7) is kept for the retention period.

Freezing a Backup Object Version after Detecting Abnormal Backup Volumes in the Backup Server In one embodiment, the backup system 600 may include the malware detection module (MDM) 602 in the second server 508 to detect abnormal backup volumes, and a new backup index 604 that reflects versions of backup data that have been frozen. The backup system may implement a method to freeze backup versions for a set of backup objects.

In the case of malware infection of the first server 506 where the malware infects (e.g. encrypts, etc.) all data (e.g. files) stored on the primary storage 510, the data volume of a backup process may be much higher compared to prior backup processes.

According to FIG. 6, the backup system 600 may implement a method to freeze backup versions for a set of backup objects. In one embodiment, the MDM 602 may detect that a current backup volume is higher than past backup volumes by a predetermined amount (e.g., by comparing the backup volumes of the current backup process to prior backup processes using historical data 518 stored in the backup server 504, etc.).

Additionally, in one embodiment, the MDM 602 may determine the set of backup objects within the current backup. For example, this set of data may include all data backed in the current backup process. Each data item in this set of data may be denoted by a backup object name (e.g., see column 1 of Table 7, etc.).

Further, in one embodiment, the MDM 602 may determine a point in time that the backup volumes first started to exceed previous backup volumes by the predetermined amount. This may be done by using the historical data 518 and finding the point in time of the first occurrence of the backup volumes that exceed a difference threshold when compared to earlier backup volumes. This determined point in time may indicate a point in time after which abnormal data modification characteristics are identified.

Further still, in one embodiment, the MDM 602 may update the extended backup index 604, according to the determined point in time. For example, the MDM 602 may identify a version of a stored object having an associated backup date (e.g., see column 2 of Table 7, etc.) that is the most recent date that precedes the determined point in time after which abnormal data modification characteristics are identified. In another embodiment, a freeze retention time may be added to the identified version (e.g., see column 4 of Table 7, etc.).

Also, in one embodiment, the MDM 602 may mark the current backup process as abnormal in the historical data 518 (e.g., see column 4 of Table 5, etc.). In another embodiment, the freeze retention period may be derived from a preconfigured parameter stored in the backup server. The freeze retention time may be variable in accordance to the set of data backed up by different backup clients.

Freezing a Backup Object Version after Detecting Abnormal Volumes of Changed Data in the Backup Client In one embodiment, in the case of a malware infection of the first server 506 where the malware for example infected (e.g. encrypts) all data (e.g. files) stored on the primary storage 510, the number of changed files (e.g., files to be backed up) may be abnormally higher.

Figure 7:
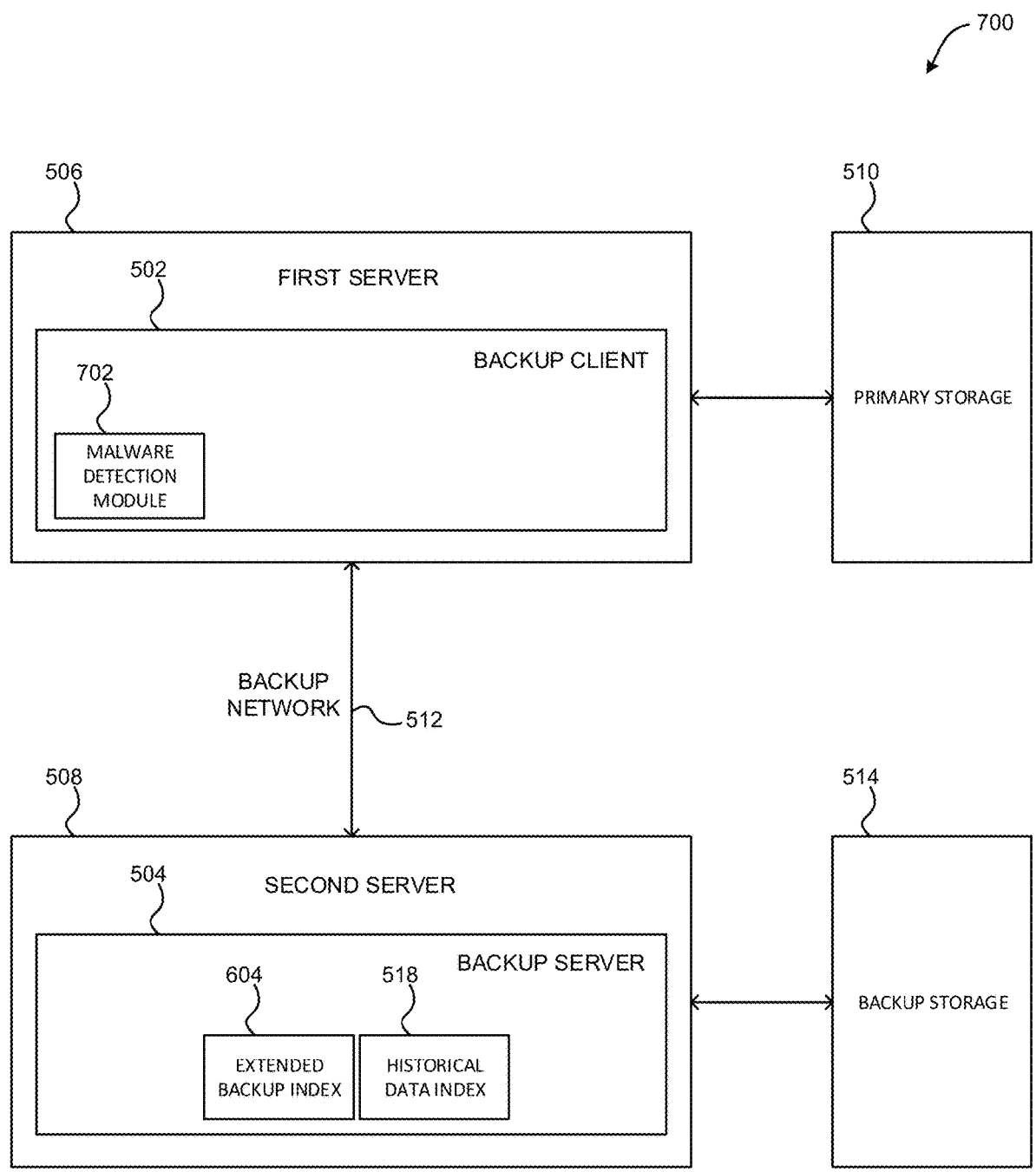
FIG. 7 illustrates another backup system for identifying and reacting to abnormal data, in accordance with one embodiment.

FIG. 7 shows a backup system 700 where a malware detection module (MDM) 702 in the backup client 502 detects that the number of changed files in the first server 506 is abnormally higher, and triggers a freeze of backup data. This may prevent sending infected data to the backup server 504.

FIG. 7 illustrates another backup system 700 for identifying and reacting to abnormal data, according to one exemplary embodiment. In one embodiment, the backup system 700 may expand the backup system 500 (in FIG. 5). The backup server 504 may include a backup index 604 as illustrated in FIG. 6. The backup server 504 also includes historical data 518 including a history of backup volumes ordered by backup clients. The backup client 502 includes a malware detection module (MDM) 702 that detects an abnormal number of changed data by matching changed data volumes of the current backup process with prior backup process information obtained from the historical data 518.

The backup system 700 may implement a method to detect an abnormal number of changed data elements and may freeze a backup version. For example, in one embodiment, the backup client MDM 702 may identify a current set of data that has changed within the first server 506 since a last backup and may calculate a number of objects that have changed.

Additionally, in one embodiment, the backup client MDM 702 may retrieve historical data 518 from the backup server 504 and may determine an historical average number of changed backup objects that have been backed up during prior backup processes. In another embodiment, the backup client MDM 702 may then determine whether the current number of changed backup objects exceeds a historical average number of changed backup objects by a threshold number.

Further, in one embodiment, upon determining that the current number of changed backup objects exceeds the historical average number of changed backup objects by the threshold number, for the current set of data that has changed within the first server 506 since the last backup, the backup client MDM 702 may identify the current set of data as abnormal, and may set the date and time of the last backup as the point in time after which abnormal data modification characteristics are identified.

For example, the MDM 702 may determine the date and time of the last backup by inquiring the extended backup index 604 (e.g., column 2 of Table 7, etc.). In another embodiment, the backup client MDM 702 may send a request to freeze the backup objects to the backup server 504 according to the time of the last backup not affected from the abnormal data modification characteristics. The backup server 504 may select the backup object (e.g., see column 1 of Table 7, etc.) according to the last backup time (e.g., see column 2 of Table 7, etc.) and may update the selected object record with the freeze retention time (e.g., see column 4 of Table 7, etc.).

In one embodiment the freeze retention time may be preconfigured in the backup server 504. In another embodiment it may be sent by the backup client MDM 702. In this way, the infected data may not be sent to the backup server 504, which may save compute and network resources.

Freezing a Backup Object Version after Detecting Infected Files by a Virus Scanner In one embodiment, a virus scanner may scan data in the primary storage 510 and may detect malware and data that has been infected by a virus. Data infected by a virus may have been encrypted or may include malware to infect more data. The virus scanner may quarantine infected files and may provide a list of infected files including the point in time when the infection was detected (e.g., an infection report (see Table 4).

Figure 8:
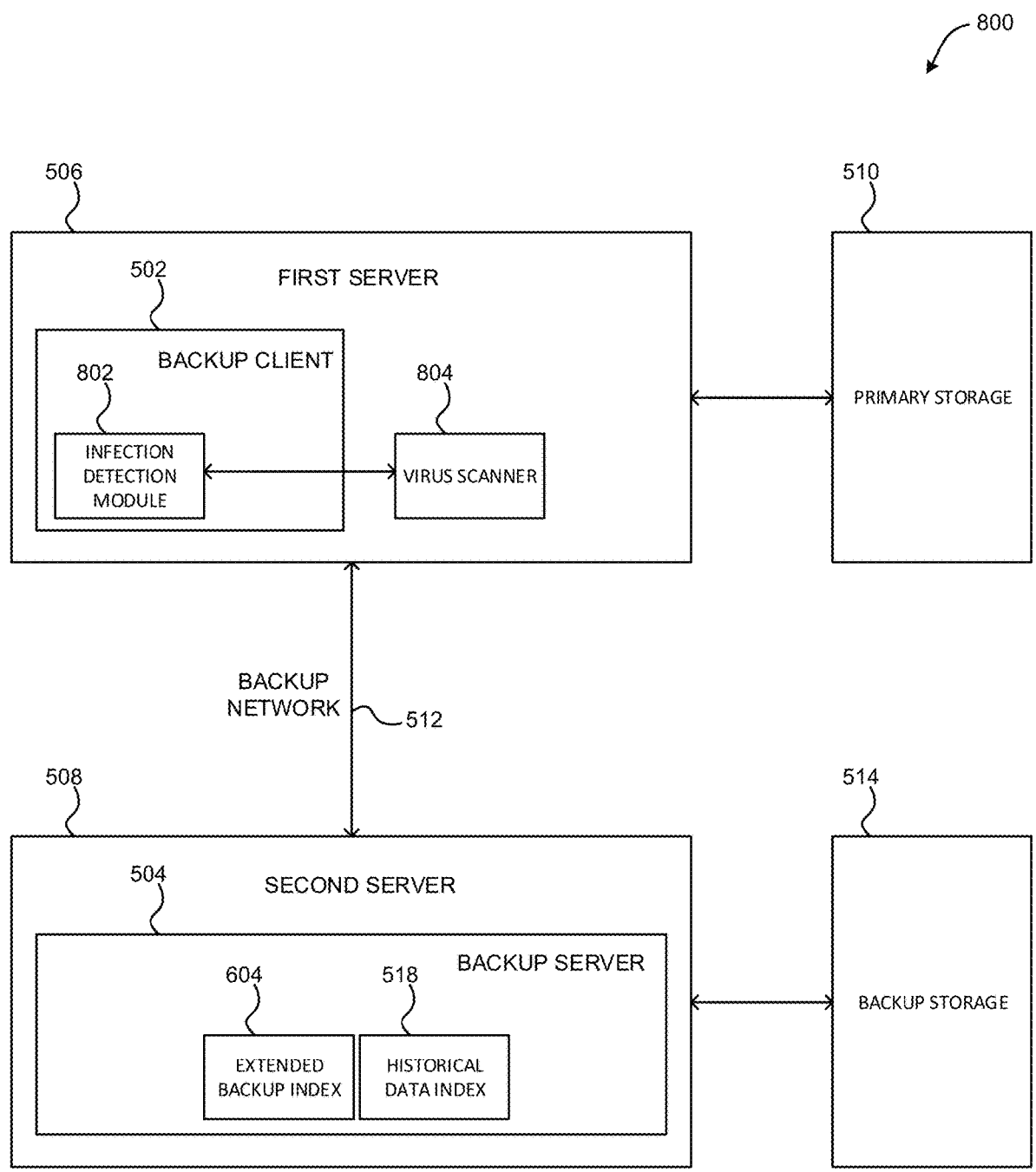
FIG. 8 illustrates a backup system where the backup client includes an infection detection module (IDM), in accordance with one embodiment.

FIG. 8 shows a backup system 800 where the backup client 502 includes an infection detection module (IDM) 802 that reads an infection report created by a virus scanner 804, determines infected files and a point in time of their infection, and freezes one or more backup objects associated with such infected files.

In one embodiment, the backup system 800 may expand the backup system 500 (in FIG. 5). The backup server 504 may include a backup index 604 as explained in Table 7. The backup client 502 includes an infection detection module (IDM) 802 that integrates with a virus scanner 804 in order to obtain the infection report (e.g., see Table 4 for an example report, etc.).

Additionally, in one embodiment, the IDM 802 may be integrated in the backup client 502. It may also be a standalone module that integrates with the virus scanner 804 to obtain the infection report and integrates with the backup server 504 to manage frozen backup object versions.

The backup system 800 may implement a method to freeze backup versions for a set of backup objects. In one embodiment, the IDM 802 may read the infection report (e.g., see Table 4 for an example report, etc.) of the virus scanner 804. This may be done through an API.

Additionally, in one embodiment, the IDM 802 may collect infection information from the infection report, including the file names (e.g., see column 1 of Table 4, etc.) and the time stamp when the infection was detected (e.g., see column 2 of Table 4, etc.) In another embodiment, for each entry in the infection report (e.g., a single row in Table 4, etc.) the IDM 802 may send the file name and the time stamp of infection to the backup server 504 along with a request to freeze this backup object version.

Further, in one embodiment, the backup server 504 may select a version of each of a set of backup objects to be frozen, based on the information received from the IDM 802. For example, for each backup object indicated by the IDM 802, the backup server 504 may identify a matching file name in the extended backup index 604. The backup server 504 may then determine, for each matching file, a stored version of the file that has a most recent backup time that predates the associated infection time stamp for the file. The backup server 504 may then update the extended backup index 604 with a freeze retention time (e.g., see column 4 in Table 7, etc.) for the determined stored version.

Further still, in one embodiment, the freeze retention time added may be a preconfigured parameter stored in the backup server 504. In another embodiment, the freeze retention time may be sent by the IDM 802. In another embodiment, the determination of infected files by the IDM 802 may be triggered by the occurrence of a predetermined event, such as a number of infected files detected by the virus scanner 804 being above a predetermined threshold.

In this way, detection of infected files may be done by a virus scanner, which may increase a certainty of infection. In addition, the detection of infected files may be done independently from the backup process and may be triggered automatically when a certain number of infected files has been detected within a certain time period. Further, compute and network resources may be saved since infected data may not be sent to the backup server 504.

Additionally, in one embodiment, a single backup server may host multiple backup clients. In another embodiment, the single backup server may host an MDM for one client of the multiple backup clients, and another client of the multiple backup clients may host its own MDM. In this way, a mixed implementation may be provided.

Restoring Frozen Object Versions

In one embodiment, frozen backup data stored at the backup server 504 may be restored to the backup client 502. For example, the backup client 502 may send a request to the backup server 504 to restore a frozen version of a backup object. In one embodiment, the request may include the name of the backup object and the date and time when the frozen version has been backed up.

Additionally, in one embodiment, the backup server 504 may receive the restore request and may select the requested frozen version of the backup object by matching the backup object name (e.g., column 1 in Table 7, etc.) and the backup date (e.g., column 2 in Table 7, etc.) using the extended backup index 604. In one embodiment, all backup objects that have a freeze retention time set (e.g., see column 4 of Table 7, etc.) may be selected.

Further, in one embodiment, if multiple frozen versions of a backup object have been selected, then the backup server 504 may select the most recent (e.g., youngest, etc.) version.

Further still, if a frozen version has been selected, the backup server 504 may determine the storage location of the selected object in the backup storage 514 (e.g., see column 3 of Table 7, etc.) and may retrieve the object from backup storage 514 and send the backup object to the backup client 502. If not back can be found, the backup server 504 may return an error to the backup client 502 indicating that the backup object version does not exist.

Preventing Versioning of Frozen Object Versions

In one embodiment, deletion of frozen object versions may be prevented during the freeze retention time. For example, if malware has infected the first server 506 and encrypts all data, then the latest unencrypted backup version may be deleted after the minimum lifecycle of an object. For example, if the number of versions kept is three and the backup process runs once a day, the latest unencrypted version may be deleted after three days. As a result, versioning of the frozen version of a backup object may be prevented.

In one embodiment, the backup server 504 may receive a backup object from the backup client 502. The backup server 504 may select the oldest/least recent version of this backup object in the extended backup index 604 by matching the backup object name (e.g., see column 1 in Table 7, etc.)

Additionally, in one embodiment, the backup server 504 may determine whether the selected backup object version has a freeze retention time in the extended backup index 604 (e.g., see column 4 in Table 7, etc.). If no freeze retention time is present, the new backup object version may be stored in the backup storage 514 and the extended backup index 604 may be updated by adding a new row (e.g., column 1-3 of Table 7 may be updated, etc.). If the version limit for this backup object is reached, then the selected oldest/least recent backup version will be deleted automatically.

Further, in one embodiment, if the selected backup object version has a freeze retention time, then the backup server 504 may determine whether the freeze retention time has expired by comparing it to the current data (e.g., a current time, date, etc.). If the freeze retention time has expired, then the backup server 504 may delete the freeze retention time value from the selected version (e.g., see column 4 of Table 7, etc.) and may store the new backup object version in the backup storage 514 and update the extended backup index 604 by adding a new row (e.g., column 1-3 of Table 7 may be updated). If the version limit for this backup object is reached, then the selected oldest/least recent backup version may be deleted automatically.

Further still, in one embodiment, if the freeze retention time of the selected backup object has not expired, then the backup server 504 may select a previous version of the backup object (e.g., a version with a next oldest time and date, etc.), and may proceed as indicated above. In another embodiment, if there is not previous version of the backup object, the backup server 504 may store the new backup object version in the backup storage 514 and may update the extended backup index 604 by adding a new row (e.g., column 1-3 of Table 7 may be updated).

Method for Prevention of Deletion of Frozen Object Versions

In one embodiment, the deletion of frozen object versions may be prevented during a retention period. As a result, deletion of frozen versions of backup objects may be prevented.

For example, in one embodiment, the backup server 504 may receive a delete request for a backup object from an administrator or from the backup client 502. The backup object may be denoted by its name in the request. The backup server 504 may select and delete from the extended backup index 604 all versions of the backup object name (e.g., see column 1 in Table 7, etc.) that have no freeze retention time set, or that have an expired freeze retention time (e.g., see column 4 in Table 7, etc.).

Moving a Frozen Object Version to Immutable Storage Area

In one embodiment, the frozen versions of backup objects may be used to restore the primary storage 510 after a malware infection. In order to prevent the frozen version to be corrupted by other means (e.g., manipulation of the primary storage 510, etc.), the frozen versions of backup objects may be stored on an immutable storage where no data can be manipulated. All or a subset of frozen object versions may therefore be stored on a dedicated storage area in the backup storage.

For example, in one embodiment, the backup server 504 may receive a request to move frozen versions of a backup object to another storage area. This request may be a scheduled request or it may result from an administrator issuing the appropriate command for this request. The set of backup objects may be denoted by the backup object names.

Additionally, in one embodiment, the backup server 504 may select the frozen versions of the set of backup objects by selecting from the extended backup index 604 objects with a matching backup object name (e.g., see column 1 in Table 7, etc.) having an active freeze retention time (e.g., see column 4 in Table 7, etc.). For each selected frozen backup object version, the backup server 504 may determine the storage location (e.g., see column 3 in Table 7, etc.) from the extended backup index 604, may move the backup object version to the new storage area, and may update the extended backup index 604 with the new storage location (e.g., see column 3 in Table 7, etc.).

Managing Retention Time of Frozen Backup Versions

In one embodiment, the retention times of frozen objects may be managed. For example, the backup server 504 may select all backup objects having a valid freeze retention time from backup index 604 (e.g., see column 4 in Table 7, etc.). For each identified backup object version, the backup server 504 may determine if the freeze retention time has expired, relative to the current time.

Additionally, in one embodiment, if the freeze retention time has not expired for an object version, the backup server 504 may determine whether the last version of the backup object is younger than the selected version. If the last version of the backup object is younger than the selected version, the backup server 504 may delete the select backup object version. If the freeze retention time has expired for an object version, the backup server 504 may remove the freeze retention time from the selected backup object version and may determine a number of versions of the backup object. If the number of versions is greater than the version limit, one or more object versions may be deleted, starting with the oldest version of the object, until the version limit is reached.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying abnormal data modification characteristics at a first system;
determining time data associated with the abnormal data modification characteristics; and
in response to identifying an instance of backup log data within a backup index stored at a second system that has an associated time and date that precedes the time data associated with the abnormal data modification characteristics, adding a freeze retention time to the instance of backup log data within the backup index, where:
the instance of backup log data includes a record describing backup data retrieved from the first system and stored in storage of the second system, and a pointer to the backup data at the second system,
the instance of backup log data is stored in the backup index, where the backup index is separate from the storage of the second system where the backup data is stored, and
the freeze retention time indicates a time period during which the instance of backup log data is to be kept within the backup index and the backup data is to be maintained within the second system.

2. The computer-implemented method of claim 1, wherein:
the first system includes a first server, a second storage that stores data, and a backup client application,
the second system includes a second server and a backup server application,
the backup client application periodically sends a copy of data from the second storage of the first system to the second system to be stored at the storage of the second system, and
the second system extracts information from the copy of the data, and stores the information in the backup index of the second system.

3. The computer-implemented method of claim 1, wherein the first system and the second system are both located on a single server.

4. The computer-implemented method of claim 1, wherein the abnormal data modification characteristics include data changed within the first system by malware present within the first system.

5. The computer-implemented method of claim 1, wherein identifying the abnormal data modification characteristics at the first system include:
identifying details of a current data backup process at the second system, where the current data backup process includes a backup of data stored at the first system, and the details of the current data backup process include a duration of the current data backup process and a volume of a current data backup;
comparing the details of the current data backup process at the second system to details of historical data backup processes stored in a table at the second system, where the details of the historical data backup processes include a duration of the historical data backup processes and a volume of historical data backups;
determining differences between the details of the current data backup process and the details of historical data backup processes at the second system; and
identifying the abnormal data modification characteristics within the current data backup process in response to determining that the differences exceed a threshold;
wherein:
the abnormal data modification characteristics are identified utilizing an antivirus infection report, and
the time data includes a date and time of a most recent data backup that was performed before a first occurrence of the abnormal data modification characteristics;
wherein the identified instance of backup log data within a backup index includes an additional field that indicates the freeze retention.

6. The computer-implemented method of claim 1, wherein identifying the abnormal data modification characteristics at the first system includes:
determining differences between details of data that has changed within the first system since a last data backup process and details of historical data backup processes; and
identifying the abnormal data modification characteristics within the data that has changed within the first system since the last data backup process in response to determining that the differences exceed a threshold.

7. The computer-implemented method of claim 1, wherein:
the abnormal data modification characteristics are identified utilizing an antivirus infection report, and
the time data includes a date and time of a most recent data backup that was performed before a first occurrence of the abnormal data modification characteristics.

8. The computer-implemented method of claim 1, wherein the identified instance of backup log data within a backup index includes a most recent instance of a plurality of backup log data instances that has the associated time and date that precedes the time data associated with the abnormal data modification characteristics.

9. The computer-implemented method of claim 1, wherein the time data includes a time value that the abnormal data modification characteristics was identified.

10. The computer-implemented method of claim 1, wherein:
the instance of backup log data includes a record describing a copy of data that is retrieved from a first storage of the first system and stored at a second storage of the second system, and
the instance of backup log data includes a time and date that the copy of the data was retrieved from the first storage of the first system and stored at the second storage of the second system.

11. The computer-implemented method of claim 1, wherein multiple instances of backup log data are associated with a single instance of data from the first system for which a backup is performed.

12. The computer-implemented method of claim 1, wherein a retention time of backup data maintained within a second storage of the second system is managed, utilizing the instance of backup log data stored in a backup index at the second system.

13. The computer-implemented method of claim 1, wherein the identified instance of backup log data within a backup index includes an additional field that indicates the freeze retention time.

14. The computer-implemented method of claim 1, comprising:
receiving the backup data at the second system,
extracting details from the backup data at the second system, and
storing the extracted details as the instance of backup log data within the backup index at the second system.

15. The computer-implemented method of claim 1, wherein the instance of backup log data having an associated freeze retention time is maintained within the backup index, and backup data associated with the instance of backup log data is maintained within a second storage of the second system, during a time period during which the instance of backup log data is to be kept within the backup index.

16. The computer-implemented method of claim 1, comprising:
receiving a request to restore data including a date and time to be restored;
selecting the instance of backup log data within the backup index at the second system, in response to the request to restore data, where the associated time and date of the instance of backup log data precedes the date and time to be restored, the instance of backup log data includes the freeze retention time, and the freeze retention time has not expired; and
restoring the instance of backup log data to a first storage of the first system.

17. A computer program product comprising one or more computer readable storage media, and program instructions collectively stored on the one or more computer readable storage media, the program instructions comprising instructions configured to cause one or more processors to perform a method comprising:
identifying abnormal data modification characteristics stored at a first system, utilizing the one or more processors;
determining time data associated with the abnormal data modification characteristics, utilizing the one or more processors; and
in response to identifying, utilizing the one or more processors, an instance of backup log data within a backup index stored at a second system that has an associated time and date that precedes the time data associated with the abnormal data modification characteristics, adding, utilizing the processor, a freeze retention time to the instance of backup log data within the backup index, where:
the instance of backup log data includes a record describing backup data retrieved from the first system and stored in storage of the second system, and a pointer to the backup data at the second system,
the instance of backup log data is stored in the backup index, where the backup index is separate from the storage of the second system where the backup data is stored, and
the freeze retention time indicates a time period during which the instance of backup log data is to be kept within the backup index and the backup data is to be maintained within the second system.

18. The computer-implemented method of claim 1, wherein:
the backup index includes an additional field associated with the backup log data that indicates the freeze retention time,
each of a plurality of instances of backup log data is associated with one of a plurality of versions of the backup data, and
the backup index includes a storage limit indicating a maximum number of instances of the backup log data to be stored within the backup index; and comprising:
in response to receiving a new instance of backup log data associated with a new version of the backup data, determining that a number of currently stored versions of the backup data stored within the backup index has reached the storage limit, and determining that an instance of the backup log data associated with the oldest version of the backup data does not have an associated freeze retention time:
deleting the instance of the backup log data associated with the oldest version of the backup data from the backup index; and
in response to receiving the new instance of backup log data associated with the new version of the backup data, determining that the number of currently stored versions of the backup data stored within the backup index has reached the storage limit, and determining that the instance of the backup log data associated with the oldest version of the backup data has an associated freeze retention time:
keeping the instance of the backup log data associated with the oldest version of the backup data in the backup index, and deleting from the backup index another instance of the backup log data that does not have an associated freeze retention time.

19. The computer-implemented method of claim 1, wherein:
the backup log data includes a record describing a copy of data that is retrieved from a first storage of the first system and stored at a second storage of the second system, wherein the backup index where the backup log data is stored is separate from the second storage of the second system used to store the copy of the data;
wherein the backup log data includes:
an indication of the data retrieved from the first storage of the first system and stored at the second storage of the second system, and
a time and date that the data was backed up.

20. A system, comprising:
a processor; and
logic integrated with the processor, executable by the processor, or integrated with and executable by the processor, the logic being configured to:
identify abnormal data modification characteristics stored at a first system;
determine time data associated with the abnormal data modification characteristics; and
in response to identifying an instance of backup log data within a backup index stored at a second system that has an associated time and date that precedes the time data associated with the abnormal data modification characteristics, add a freeze retention time to the instance of backup log data within the backup index, where:
the instance of backup log data includes a record describing backup data retrieved from the first system and stored in storage of the second system, and a pointer to the backup data at the second system,
the instance of backup log data is stored in the backup index, where the backup index is separate from the storage of the second system where the backup data is stored, and
the freeze retention time indicates a time period during which the instance of backup log data is to be kept within the backup index and the backup data is to be maintained within the second system.

* * * * *